United States Patent
Buechele et al.

(10) Patent No.: US 6,836,717 B2
(45) Date of Patent: Dec. 28, 2004

(54) AUTOMOTIVE BUMPER ACTIVE ENERGY ABSORPTION SYSTEM

(75) Inventors: John G. Buechele, Dayton, OH (US); Gregory A. Cazzell, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 84 days.

(21) Appl. No.: 10/286,700

(22) Filed: Nov. 1, 2002

(65) Prior Publication Data

US 2004/0088091 A1 May 6, 2004

(51) Int. Cl.$^7$ .............................................. B60R 19/38
(52) U.S. Cl. ..................... 701/45; 180/282; 293/132
(58) Field of Search ..................... 701/1, 45; 180/271, 180/282; 293/2, 4, 10, 104, 129, 132

(56) References Cited

U.S. PATENT DOCUMENTS 6,186,486 B1  2/2001  Gutman et al.
6,419,289 B1  7/2002  Batten et al.

Primary Examiner—Gary Chin
(74) Attorney, Agent, or Firm—Michael D. Smith

(57) ABSTRACT

Active control of a vehicle bumper damper is provided. A damper controller receives data from a collision data acquisition device and sends a control signal to configure an active damper based on the received data. During a collision or immediately preceding a collision the vehicle bumper damper is adjusted using the damper controller mechanism that responds to real-time collision information. A vehicle including an active control system for a vehicle bumper is provided. The vehicle includes a collision data acquisition device, a damper controller coupled to the collision data acquisition device, and an active damper coupled to the damper controller. The damper controller receives data from the collision data acquisition device and sends a control signal to configure the active damper based on the received data.

19 Claims, 5 Drawing Sheets

AUTOMOTIVE BUMPER ACTIVE ENERGY ABSORPTION SYSTEM

TECHNICAL FIELD OF THE INVENTION

This invention relates to vehicle bumper systems, and more particularly to provisions of bumper systems for reducing the damage to vehicles from collision force imparted to a bumper when the vehicle is involved in a collision.

BACKGROUND OF THE INVENTION

Vehicles such as automobiles, trucks, buses, and motor homes typically include a bumper at the front and rear, having a shock absorption system disposed between the bumper and the vehicle chassis.

In a collision involving a major impact to a vehicle, the bumper is designed to reduce the impact forces to protect the vehicle driver. However, common vehicle bumper designs seek to dissipate high impact forces through the compression of a damper and transmission of remaining force to the vehicle frame. Such systems generally have very high static damping coefficients and therefore are limited to dissipating higher speed collision forces.

A current concern among auto consumers and insurers alike is potential cosmetic damage caused by very low speed collisions. Many vehicles now use a molded panel as part of an integrated bumper assembly. Such bumpers are designed to absorb high-speed impact forces and generally are too stiff to dissipate the force from a low speed collision on the order of approximately 5 miles per hour. Resultant reaction forces reflected back from a damper may cause cosmetic damage to the bumper panels that obviate panel replacement. Changing the plasticity of an integrated bumper panel may help reduce cracking or breakage somewhat, but does not fully address the stiffness of the damper. It would be desirable, therefore, to provide a vehicle bumper damper system that overcomes these and other disadvantages.

SUMMARY OF THE INVENTION

The present invention is directed to a system and method for an improved vehicle bumper system. The bumper system has improved collision damping properties. During a collision or immediately preceding a collision a vehicle bumper damper is adjusted using a damper controller mechanism that responds to real-time collision information.

In accordance with the invention, a method and system is directed to active control of a vehicle bumper damper. Means for sensing collision data in real time and means configuring the vehicle bumper damper based on the sensed data are also provided.

In accordance with another aspect of the invention, a vehicle including an active control system for a vehicle bumper is provided. The vehicle includes a collision data acquisition device, a damper controller coupled to the collision data acquisition device, and an active damper coupled to the damper controller. The damper controller receives data from the collision data acquisition device and sends a control signal to configure the active damper based on the received data.

The foregoing and other features and advantages of our invention are apparent from the following detailed description of exemplary embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Throughout the specification, and in the claims, the term "connected" means a direct electrical connection between the things that are connected, without any intermediate devices. The term "coupled" means either a direct electrical connection between the things that are connected or an indirect connection through one or more passive or active intermediary devices such as a bidirectional data bus or the equivalent. Whenever possible, similar elements follow a common numbering convention throughout the figures. The term "software module" is any set of computer executable instructions, data structures and the like, or the equivalent reduced to circuits using a high-level description language, that perform a specified function when called to run as a process. In the following system diagrams, many connections to components such as AC or DC power are omitted for clarity. It is assumed that those skilled in the art will appreciate components requiring power or other connections not essential to the description of the system.

The present invention is directed to a system and method for an improved vehicle bumper system. A data acquisition device is configured to sense collision data in real-time and provide the sensed data to a damper controller. The damper controller is configured to generate a control signal to configure a bumper damper in response to the sensed collision data. In a first example the system functions independently of other vehicle systems. In a second example the system is enabled to communicate via a vehicle multiplex communication bus. In a third example the system is enabled to be controlled by a vehicle central processor. In each example, the system may be viewed as an integral system of an assembled vehicle or as a completely independent system that is able to perform the described functions when combined with an assembled vehicle.

ACTIVE CONTROL SYSTEM FOR A VEHICLE BUMPER DAMPER

Figure 1:
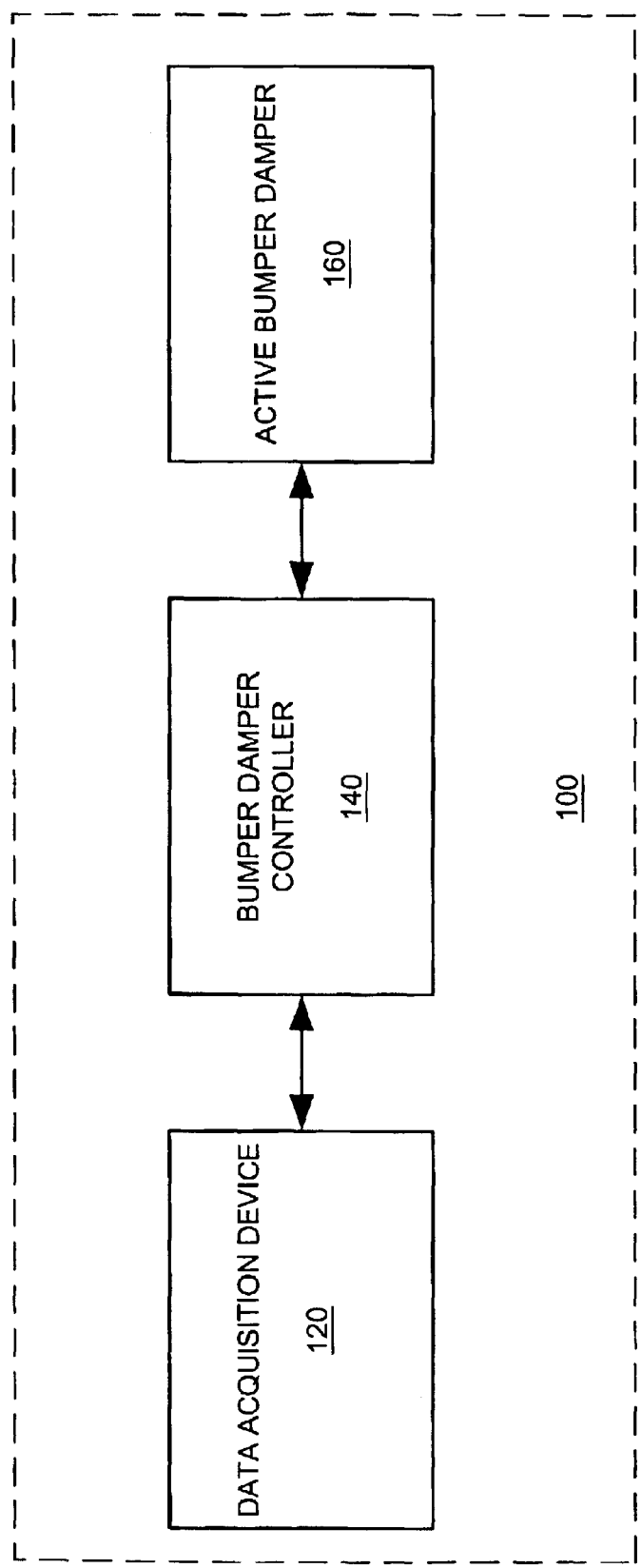
FIG. 1 shows an exemplary embodiment of a system for active control of a vehicle bumper damper in accordance with the present invention.

FIG. 1 shows an exemplary embodiment of a system for active control of a vehicle bumper damper 100. As depicted in FIG. 1, the active control system 100 includes a data acquisition device 120, a bumper damper controller 140, and an active bumper damper 160. The data acquisition device 120 is shown coupled to the bumper damper controller 140. The bumper damper controller 140 is shown coupled to the active bumper damper 160.

In operation, the active control system (hereinafter, "control system") 100 incorporates a data acquisition device 120 to obtain collision data. The data acquisition device 120 is a sensing device such as, but not limited to, a positional sensor, an accelerometer, a vehicle proximity system and the like. Such terms as sensor, proximity system, accelerometer and data acquisition device are taken to be equivalents and are used interchangeably throughout this specification. Collision data is the generated output of a data acquisition device 120. Collision data may be an analog or digitally encoded signal that represents a voltage or current proportional to a physical deflection for example, or other information such as measured or estimated velocities, for instance. A vehicle proximity system such as a Park Distance Control, Intelligent Cruise Control, or a type of Doppler proximity detection and the like, may be configured to determine closing rates for objects approaching a vehicle. Proximity systems are therefore capable of providing multiple types of collision data, such as closure rates, time to impact and estimated forces, among others and in several forms including, but not limited to, data structures, scripts or other types of executable code.

If the collision data acquisition device 120 is a positional sensor or accelerometer, the sensor generally provides a signal that represents bumper panel deflection or other indicia of actual collision occurrence. Collision data therefore is either a detection of actual collision forces and the like, or detection of an impending collision and related calculated or estimated data concerning the impending collision. Methods and systems for generating and interpreting collision data are well understood and documented by those skilled in the art.

In operation, the control system 100 also incorporates a bumper damper controller 140 to receive collision data provided by the data acquisition device 120. The bumper damper controller 140 (hereinafter "controller") is a device such as, but not limited to, a microcontroller, a software module able to run on a processor, an electromechanical switch assembly including but not limited to a solenoid, and an amplifier or a combination of such devices and the like. The controller is able to receive data from the data acquisition device and generate a control signal based on the received data. In one embodiment, the controller 140 is able to query the data acquisition device for specific data. In another embodiment the controller 140 is able to initiate a data acquisition mode or cycle. The control signal is an analog or digitally encoded signal and may represent voltages, currents, computer code instructions and the like. The bumper damper controller 140 may be a discrete unit or integrated with other devices or systems. In one embodiment, data acquisition device 120 and controller 140 are an integrated unit.

In operation, the control system 100 incorporates an active bumper damper 160 to receive the control signal provided by the controller 140. The active bumper damper 160 (hereinafter "damper") is usually an element of an actively controlled coil-over damper assembly containing among other things, a damper such as, but not limited to, a bi-state damper, a continuously-variable damper (CV), a magnetorheological damper (MR), and the like.

Both the coil and the damper contribute to the damping properties of a vehicle bumper assembly. Various equivalent means and techniques for implementing multi-state dampers in a coil-over-damper assembly are well known to those skilled in the art. An active damper 160 allows the damping coefficient to be changed using an appropriate control signal. The damper 160 is able to receive the control signal from the controller 140. In one embodiment the damper 160 is able to receive and implement computer code instructions.

A damper 160 of the bi-state variety has two modes of controlled damping: full soft and full firm. In one embodiment, the nominal mode of operation for a bi-state damper is full firm. A control signal from the damper controller 140 is required only to configure the damper for full soft mode. In such an instance, the damper controller 140 sends a control signal only when a low-speed collision event is determined. If a higher speed collision event is determined, the controller 140 is not required to provide a control signal to the damper 160. An inherent advantage of the presently discussed embodiment is that failure of the system 100 does not compromise the vehicle bumper system for a higher-speed collision since the default bumper design is always maintained. Additionally, in the presently discussed embodiment, a damper 160 may be selected that does not require power unless a collision event occurs, further reducing system 100 demands on the vehicle. A bi-state damper 160 may be implemented with a CV-type or an MR-type damper 160.

A damper 160 of the CV or MR variety is capable of multiple modes of controlled damping or even continuous damping through a range. In another embodiment, the nominal mode of operation for a CV or MR damper 160 is full firm. A control signal from the damper controller 140 is required to configure the damping mode of the damper 140 within a range from full firm to full soft mode. In such an instance, the damper controller 140 sends a control signal to the damper when a low-speed collision event is determined. In yet another embodiment, the controller 140 is enabled to continuously vary the damping characteristics of the damper 160 responsive to a signal from the damper 160. In one alternative embodiment, the controller 140 is enabled to continuously vary the damping characteristics of the damper 160 responsive to collision data. In one embodiment, the damper 160 is selected for rapid control signal response characteristics allowing configuration within about 1–100 milliseconds of receiving a control signal. Other exemplary configurations for control system 100 are presented in FIGS. 2–4.

Figure 2:
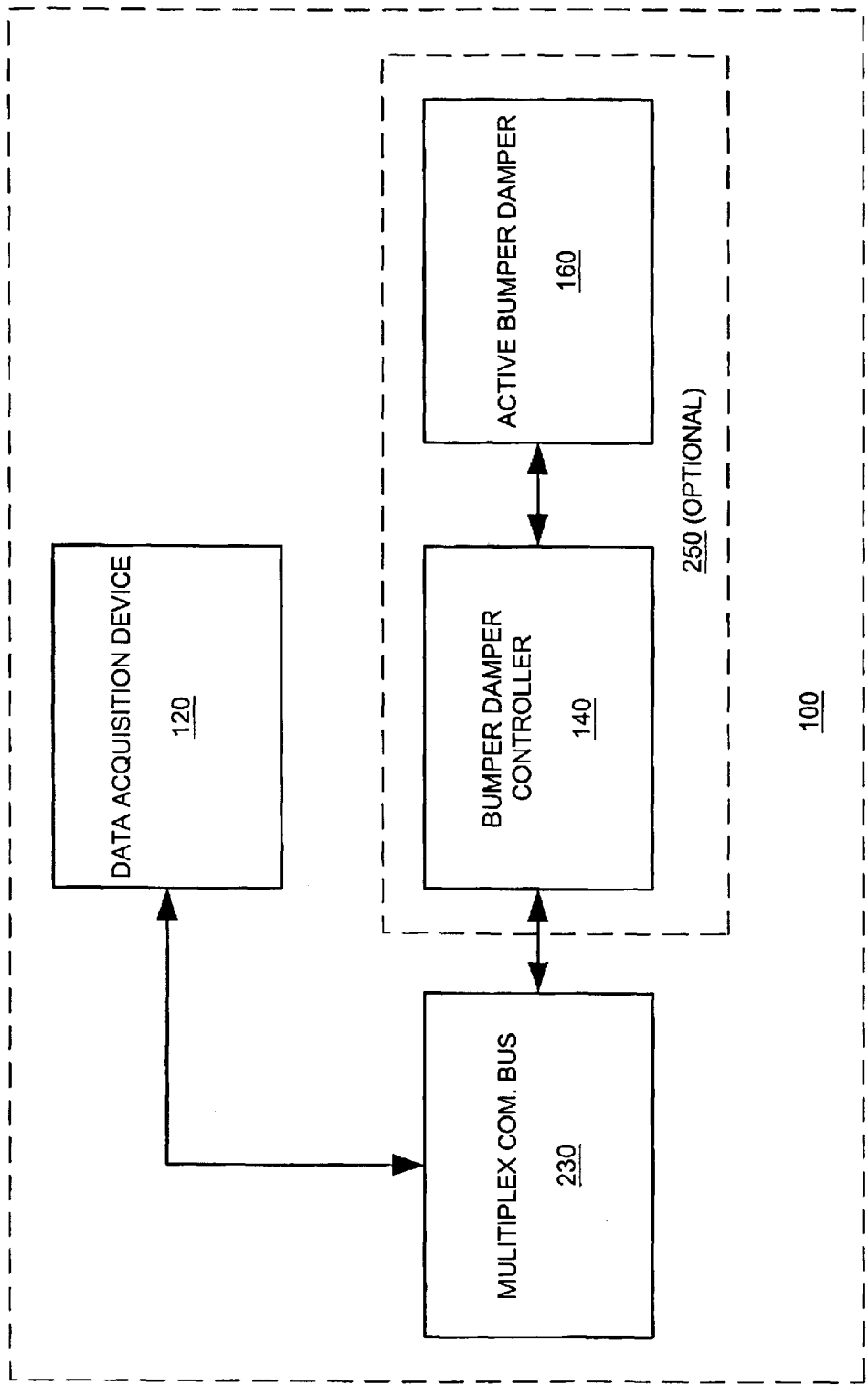
FIG. 2 shows a second exemplary embodiment of the active control system of FIG. 1 in accordance with the present invention.

FIG. 2 is a second exemplary embodiment of the active control system of FIG. 1. As depicted in FIG. 2, the active control system 100 of FIG. 1 now includes the data acquisition device 120, the bumper damper controller 140, the active bumper damper 160, and a multiplex communication bus 230. The bumper damper controller 140 and the active bumper damper 160 are shown optionally combined as a controller-damper unit 250. The data acquisition device 120 is shown coupled to the bumper damper controller 140. The bumper damper controller 140 is shown coupled to the multiplex communication bus 230. The multiplex communication bus 230 is shown coupled to the active bumper damper 160. The bumper damper controller 140 is shown coupled to the active bumper damper 160.

In operation, the control system 100 incorporates a multiplex communication bus 230 to receive collision data provided by the data acquisition device 120. The multiplex communication bus is a bi-directional data bus able to enable multiple connected devices to exchange data. Devices coupled to the multiplex communication bus 230 generally have unique addresses that allow them to be identified and accessed by other devices. Methods and systems for implementing a multiplex communication bus 230 will be known by those skilled in the art, and will not be further elaborated.

The controller system 100 configuration of FIG. 2 is particularly useful where the data acquisition device 120 is remote from the bumper damper controller or is functionally part of another vehicle system, such as a vehicle proximity system. In one embodiment the optional controller-damper unit 250 provides the functions of the controller 140 and the damper 160. Various benefits accrue when units are combined, such as lowered manufacturing costs and reduced power demands for example.

Figure 3:
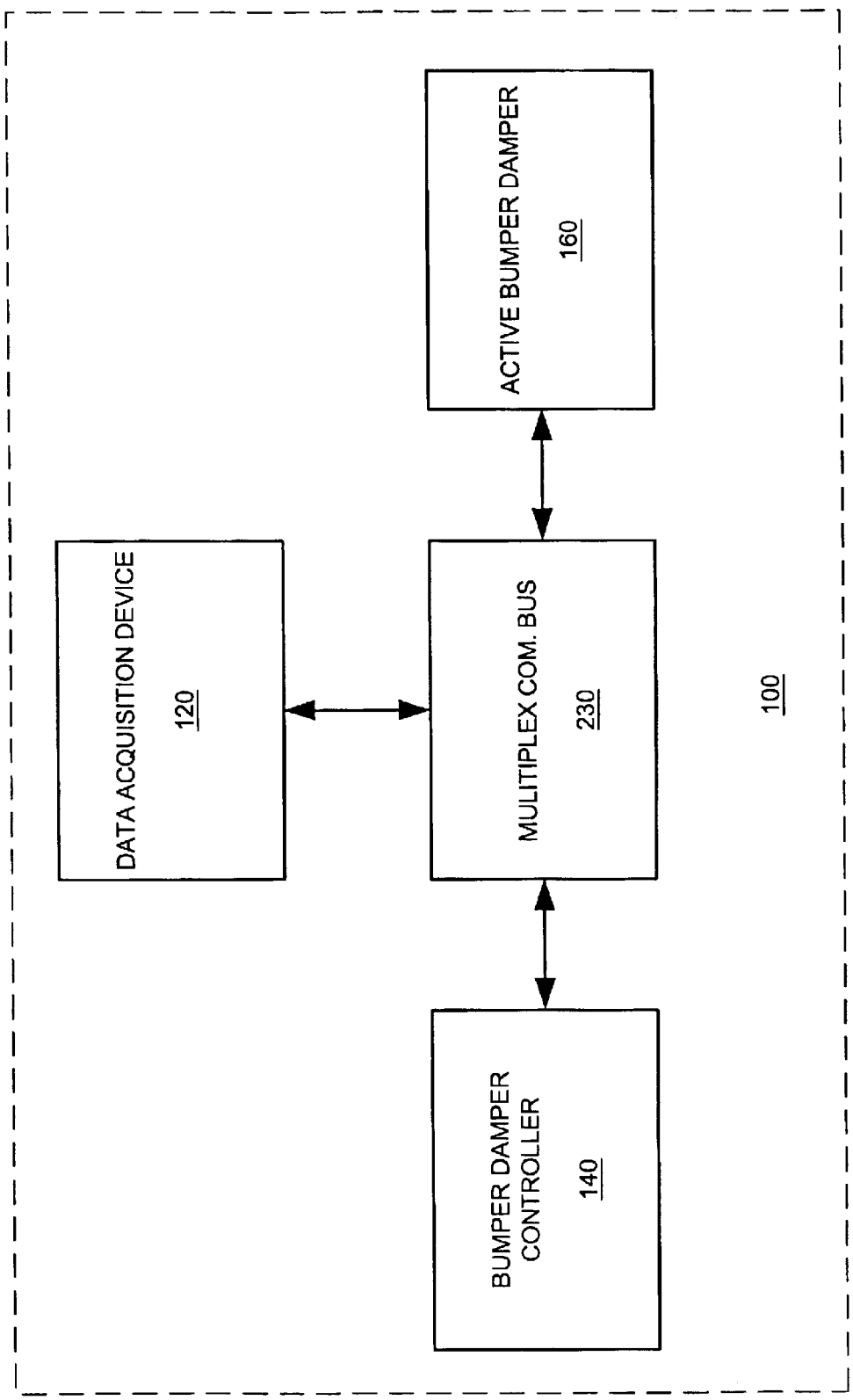
FIG. 3 shows a third exemplary embodiment of the active control system of FIG. 1 in accordance with the present invention.

FIG. 3 is a third exemplary embodiment of the active control system of FIG. 1. As depicted in FIG. 3, the active control system 100 of FIG. 1 now includes the data acquisition device 120, the bumper damper controller 140, the active bumper damper 160, and the multiplex communication bus 230 of FIG. 2. The data acquisition device 120 is shown coupled to the multiplex communication bus 230. The bumper damper controller 140 is shown coupled to the multiplex communication bus 230. The active bumper damper 160 is shown coupled to the multiplex communication bus 230.

The controller system 100 configuration of FIG. 3 finds application in vehicles that rely primarily on a centralized multiplex communication bus 230. In a vehicle with highly integrated electronic systems, there is an advantage to enabling as many devices as possible to communicate with the multiplex communication bus 230. One advantage of integration with an existing multiplex communication bus 230 is the availability of computer controlled diagnosis of failed components and system errors. A system as depicted in FIG. 3 may also be coupled to vehicle processor through the multiplex communication bus 230.

Figure 4:
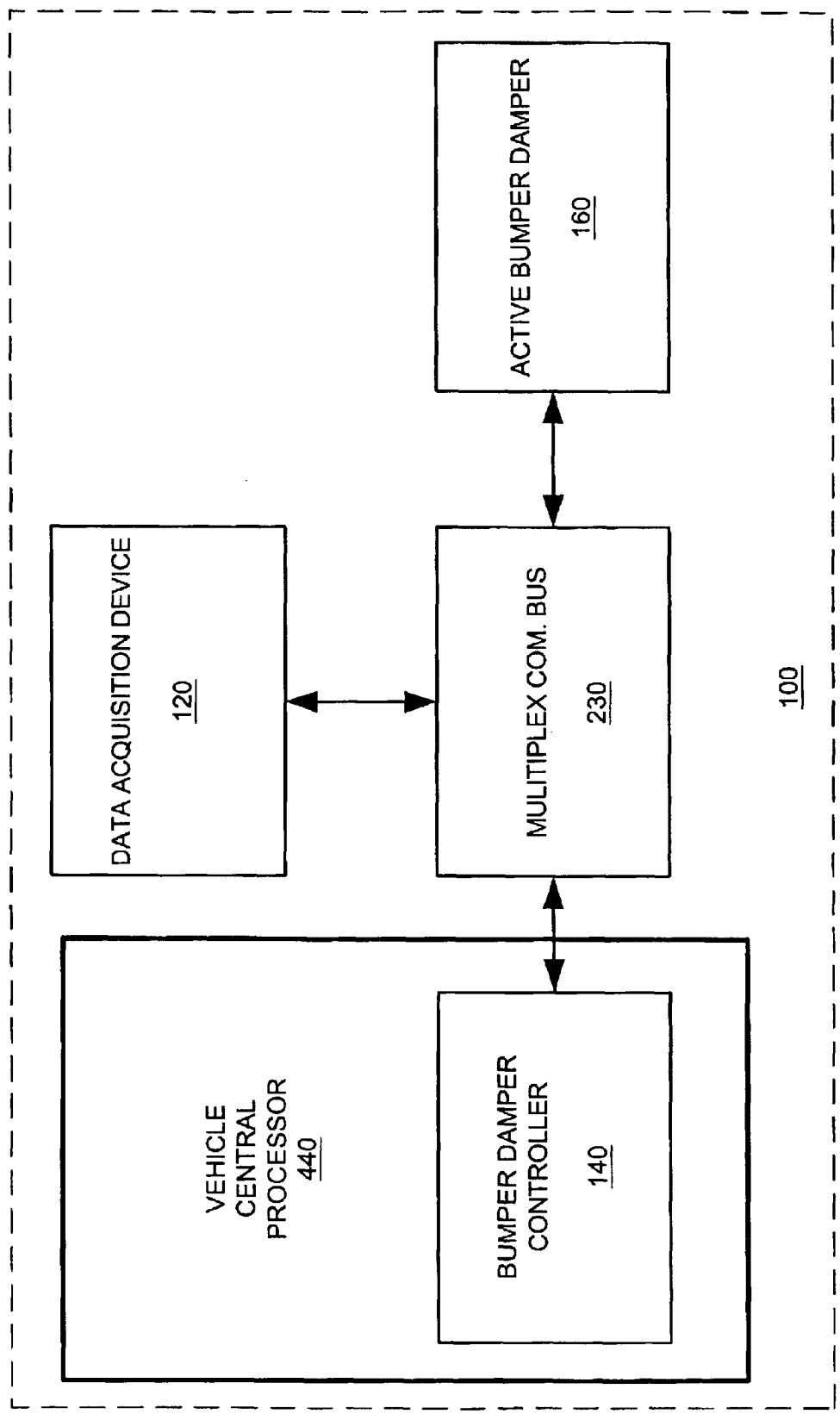
FIG. 4 shows a fourth exemplary embodiment of the active control system of FIG. 1 in accordance with the present invention; and, FIG. 5 is a flow diagram of a method for active control of a vehicle bumper damper in accordance with the present invention.

FIG. 4 is a fourth exemplary embodiment of the active control system of FIG. 1. As depicted in FIG. 4, the active control system 100 now includes the data acquisition device 120, a vehicle central processor 440 containing the bumper damper controller 140, the active bumper damper 160, and the multiplex communication bus 230 of FIG. 2. The data acquisition device 120 is shown coupled to the multiplex communication bus 230. The bumper damper controller 140 is shown coupled to the multiplex communication bus 230. The active bumper damper 160 is shown coupled to the multiplex communication bus 230.

In the present embodiment, the vehicle central processor 440 is able to perform the functions of the controller 140. The vehicle central processor 440 may contain a software module able to perform the controller 140 functions. Alternatively, the vehicle central processor 440 may contain a secondary processor able to perform the controller 140 functions. Persons skilled in the art will appreciate that other systems and methods for implementing the functions of the processor within the vehicle central processor 440, are possible and equivalent. An advantage to the present embodiment is the complete integration of system 100 function with a vehicle, and therefore reduction of redundancy.

It is to be appreciated that the foregoing exemplary embodiments are not exhaustive, and do not represent all possible embodiments for control system 100. Additionally, the various techniques for configuring control system 100 embodied in FIGS. 1–4 may be modified or combined without altering the function or scope of the invention.

Method for Active Control of a Vehicle Bumper Damper

A data acquisition device configured to sense collision data in real-time provides the sensed data to a damper controller. The damper controller generates a control signal to configure a bumper damper in response to the sensed collision data. Additional steps not elucidated may occur within the following description and some steps may be combined, omitted or occur in a different order without departing from the spirit and scope of the invention.

Figure 5:
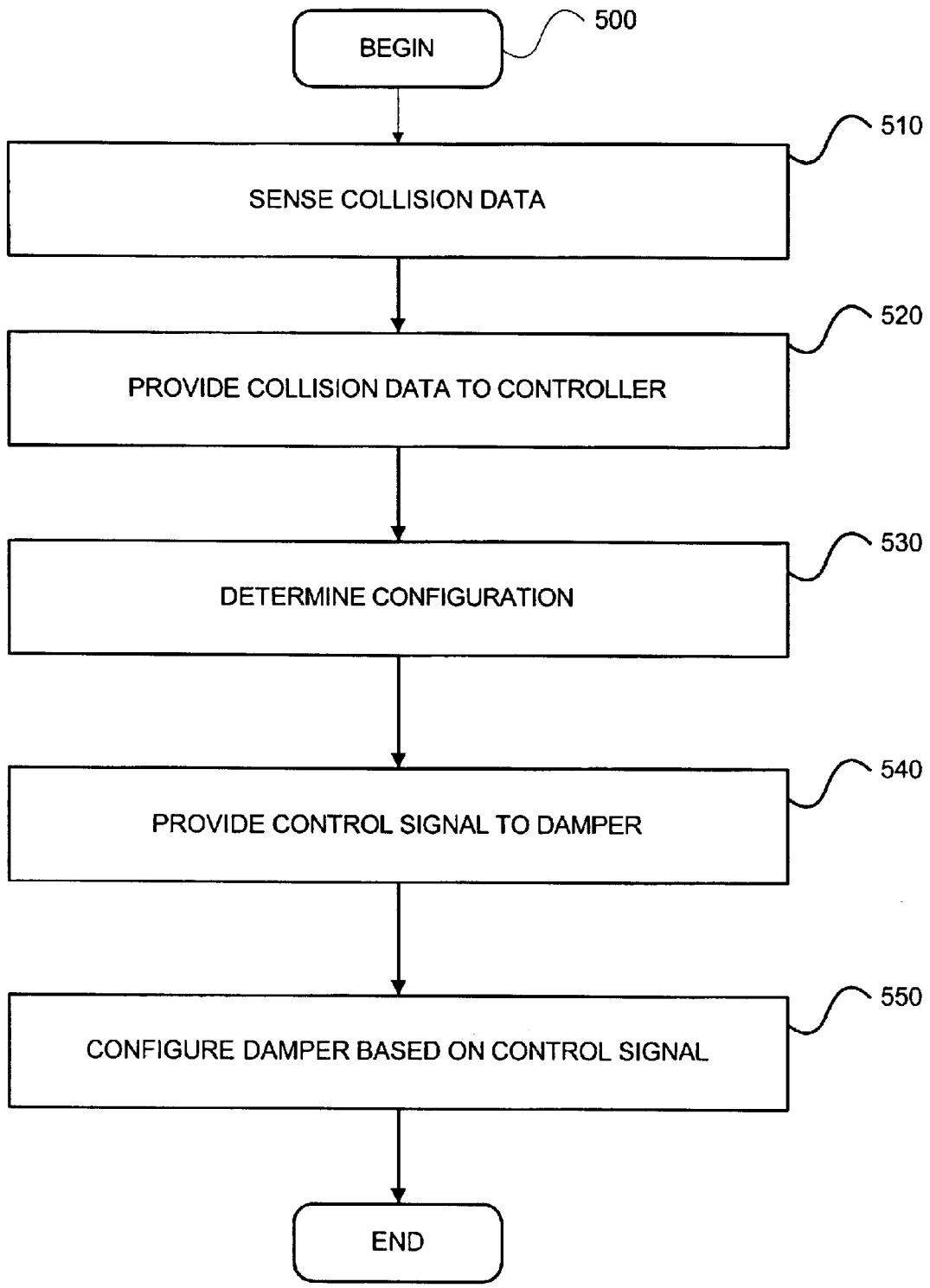

FIG. 5 is a flow diagram of a method for active control of a vehicle bumper damper. Process 500 begins in step 510. Collision data is sensed in step 510. The sensed collision data is the output of a sensor such as data acquisition device 120 of FIG. 1, including a positional sensor, an accelerometer or a vehicle proximity system, for example. The sensed collision data represents a collision event or an impending collision event. The collision data may be sensed in real-time or may be subject to a buffered delay. Collision data is an analog or digitally encoded signal representing current, voltage, and time-based information such as velocity, closing rates, time to impact and the like. Collision data may be sensed on demand or continuously.

In step 520, collision data sensed in step 510 is provided to a bumper damper controller, such as controller 140 of FIG. 1. The collision data is provided on demand or continuously, depending on the specific implementation. The collision data is provided in a form that the controller is able to receive.

In step 530, the sensed collision data provided in step 520 is used to determine a bumper damper configuration. The bumper damper is a device such as damper 160 of FIG. 1. A configuration for the damper is determined based on the sensed data to provide a specific damping rate. The controller is a processor, software module or equivalent employed to interpret the collision data and then enable a damper configuration based on predetermined decision criteria. Alternatively, the controller may be a switch or other electromechanical device that relays a voltage or current collision data signal to a damper. The controller is generally able to determine that no action is necessary based upon the collision data and terminate or renew process 500.

In step 540, a control signal is provided to a damper based on the determination of step 530. The control signal is provided on demand or continuously, depending on the specific implementation. The control signal is provided in a form that the damper is able to receive.

In step 550, the damper is configured based on the control signal provided in step 540. The damper is a device such as damper 160 of FIG. 1. The damper is able to receive the control signal and alter its damping properties based on the control signal. The damper is constructed so that dynamic changes to the damping characteristic are effected when the control signal is received. For example, a valve on the damper may be opened or closed based on the control signal, thereby altering the damping properties of the damper. After the damper is configured in step 550 based on the control signal provided in step 540, process 500 terminates.

An example of the system and method of the invention in operation is now provided. However, the following illustrations are merely examples of the manner in which the invention may be practiced and in no way are intended to describe all applications or to cite all known embodiments.

A modern automobile is a wonder of integration. Many automobiles include centralized electronic engine and system management functionality, including extensive diagnostic functions through a vehicle "brain" computer system. The system of the invention is capable of sensing an imminent low-speed collision and configuring the bumper to reduce the impact damage with the addition of a collision avoidance system employing a form of radar to provide constant data to the vehicle computer. The computer is enabled to recognize the collision data and to call separate subroutines or enable dedicated systems to both modulate the brake system and to configure the bumper dampers all in real time.

For example, a system-enabled automobile is navigating a parking lot. A second vehicle begins backing out of a parking space a few feet in front of the system-enabled automobile which triggers the collision avoidance system. The driver of the system-enabled automobile may or may not be applying force to the brake pedal, as a collision avoidance system is able of braking for the driver. The system-enabled auto is initially traveling at a low speed and an imminent collision will occur with a remaining speed of about 5 miles per hour at the collision point. The bumper dampers are configured for a low-speed impact based on data provided by the collision avoidance system.

In a second example, a system enabled automobile has a positional sensor mounted in the bumper. A driver of the vehicle approaches a red light with several cars in line in front. The roads are coated with compact snow and ice. The driver begins to slow 100 feet before the stopped cars but encounters the ice. The driver applies full braking force and then pumps the brake pedal in an attempt to avoid a collision. The vehicle slows and eventually slides into the back of the automobile directly to the front. As the collision occurs at a low speed, the positional sensor detects a deflection of the bumper and the system configures the bumper damper to have full soft damping. The bumper is able to absorb the collision force with no damage to the vehicle. Additionally, the same scenario could have a third automobile colliding with the rear of the system-enabled vehicle with the same result; that is, a low-speed rear-end collision that causes no damage to the system-enabled vehicle. The system of the invention is equally able of retrofit to existing automobiles, where a bumper system containing the system is fitted to the front or rear.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

We claim:

1. A method for active control of a vehicle bumper damper comprising:
   sensing collision data in real time; and
   configuring the vehicle bumper damper based on the sensed data, wherein a bumper damper default configuration is optimized for damping a high-speed collision and wherein the method configures the bumper damper only when the sensed data indicate a low-speed collision.

2. The method of claim 1 wherein the sensed collision data is the output of a data acquisition device selected from the group consisting of a positional sensor, an accelerometer, and a vehicle proximity system.

3. The method of claim 1 wherein the sensing of collision data is controlled by a vehicle central processing unit.

4. The method of claim 1 wherein the configuring a bumper damper is controlled by a vehicle central processing unit.

5. The method of claim 1 wherein configuring a damper includes modulating the damping coefficient of the bumper damper.

6. The method of claim 5 wherein the bumper damper damping coefficient is configured for a low-speed impact.

7. The method of claim 5 wherein the damping coefficient of the bumper damper is a continuously modulated in real-time.

8. The method of claim 1 wherein the configuring a vehicle bumper damper occurs within about 1–100 milliseconds of the sensing of the collision data.

9. An active control system for a vehicle bumper damper comprising:
   a collision data acquisition device;
   a damper controller operably coupled to the collision data acquisition device, and;
   an active damper operably coupled to the damper controller, wherein the damper controller receives data from the collision data acquisition device and sends a control signal to configure the active damper based on the received data, wherein a bumper damper default configuration is optimized for damping a high-speed collision and wherein the system configures the bumper damper only when the sensed data indicate a low-speed collision.

10. The active control system of claim 9 wherein the collision data acquisition device is selected from the group consisting of an accelerometer, a position sensor and a vehicle proximity system.

11. The active control system of claim 10 wherein the collision data acquisition device is operably coupled to a vehicle central processor.

12. The active control system of claim 9 wherein the data is transferred from the collision data acquisition device to the damper controller via a vehicle multiplex communication bus.

13. The active control system of claim 9 wherein the active damper is selected from the group consisting of a bi-state damper, a CV damper, and an MR damper.

14. The active control system of claim 9 wherein a vehicle central processor is able to operate as the damper controller.

15. A vehicle including:
   an active control system for a vehicle bumper comprising:
   a collision data acquisition device;
   a damper controller operably coupled to the collision data acquisition device, and;
   an active damper operably coupled to the damper controller, wherein the damper controller receives data from the collision data acquisition device and sends a control signal to configure the active damper based on the received data, wherein a bumper damper default configuration is optimized for damping a high-speed collision and wherein the system configures the bumper damper only when the sensed data indicate a low-speed collision.

16. The vehicle of claim 15 wherein the collision data acquisition device is selected from the group consisting of an accelerometer, a position sensor and a vehicle proximity system.

17. The vehicle of claim 15 wherein the collision data acquisition device is operably coupled to a vehicle central processor.

18. The vehicle of claim 15 wherein a vehicle central processor is able to operate as the damper controller.

19. An apparatus for active control of a vehicle bumper damper comprising:
   means for sensing collision data in real time; and
   means for configuring the vehicle bumper damper based on the sensed data, wherein a bumper damper default configuration is optimized for damping a high-speed collision and wherein the system configures the bumper damper only when the sensed data indicate a low-speed collision.

* * * * *